(12) United States Patent
Lorrain-Hale

(10) Patent No.: US 11,816,313 B1
(45) Date of Patent: Nov. 14, 2023

(54) METHOD AND SYSTEM OF MANAGING AND DISPLAYING DOCUMENT ANNOTATION SURFACES

(71) Applicant: Microsoft Technology Licensing, LLC, Redmond, WA (US)

(72) Inventor: Theo Lorrain-Hale, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/740,277

(22) Filed: May 9, 2022

(51) Int. Cl.
*G06F 3/0484* (2022.01)
*G06F 40/169* (2020.01)

(52) U.S. Cl.
CPC .......... *G06F 3/0484* (2013.01); *G06F 40/169* (2020.01)

(58) Field of Classification Search
CPC .............................. G06F 40/169; G06F 3/0484
See application file for complete search history.

(56) References Cited

U.S. PATENT DOCUMENTS

| | | | |
|---|---|---|---|
| 8,510,646 B1 | 8/2013 | Young et al. | |
| 9,753,921 B1* | 9/2017 | DeVincenzi | G06F 40/169 |
| 2007/0055926 A1* | 3/2007 | Christiansen | G06F 40/169 |
| | | | 715/244 |
| 2009/0265607 A1* | 10/2009 | Raz | G06F 16/957 |
| | | | 709/217 |
| 2010/0031135 A1* | 2/2010 | Naghshin | G06Q 10/10 |
| | | | 715/230 |
| 2014/0292999 A1* | 10/2014 | Do | H04L 65/403 |
| | | | 348/14.07 |
| 2014/0330911 A1* | 11/2014 | Hunter | G06F 16/13 |
| | | | 709/206 |
| 2016/0041961 A1* | 2/2016 | Romney | G06F 40/106 |
| | | | 715/230 |
| 2017/0012993 A1* | 1/2017 | Lieu | G06F 40/117 |
| 2019/0266220 A1* | 8/2019 | Shingu | G06F 40/103 |

OTHER PUBLICATIONS

"Converting Notes to Comments", Retrieved from: https://www.ibm.com/docs/en/engineering-lifecycle-management-suite/design-rhapsody/8.3.1?topic=diagrams-converting-notes-comments, Jul. 9, 2021, 1 Page.
"DALIM Dialogue Engine—Annotations Overview", Retrieved from: https://www.youtube.com/watch?v=kygt2OHquwA, Sep. 30, 2015, 2 Pages.
"International Search Report and Written Opinion Issued in PCT Application No. PCT/US23/013566", dated May 22, 2023, 11 Pages.

* cited by examiner

*Primary Examiner* — Daniel Samwel
(74) *Attorney, Agent, or Firm* — NovoTechIP International PLLC

(57) ABSTRACT

A method for managing annotation surfaces for a document includes receiving a request to add a note to a document, displaying a first user interface (UI) surface for the note, the first UI surface including an editable surface that is editable by a plurality of users and the first UI surface enabling visibility of content to the plurality of users in real-time, and attaching a second UI surface to the first UI surface, the second UI surface being a UI surface for a comment and the second surface UI surface requiring user action for posting the comment.

20 Claims, 16 Drawing Sheets

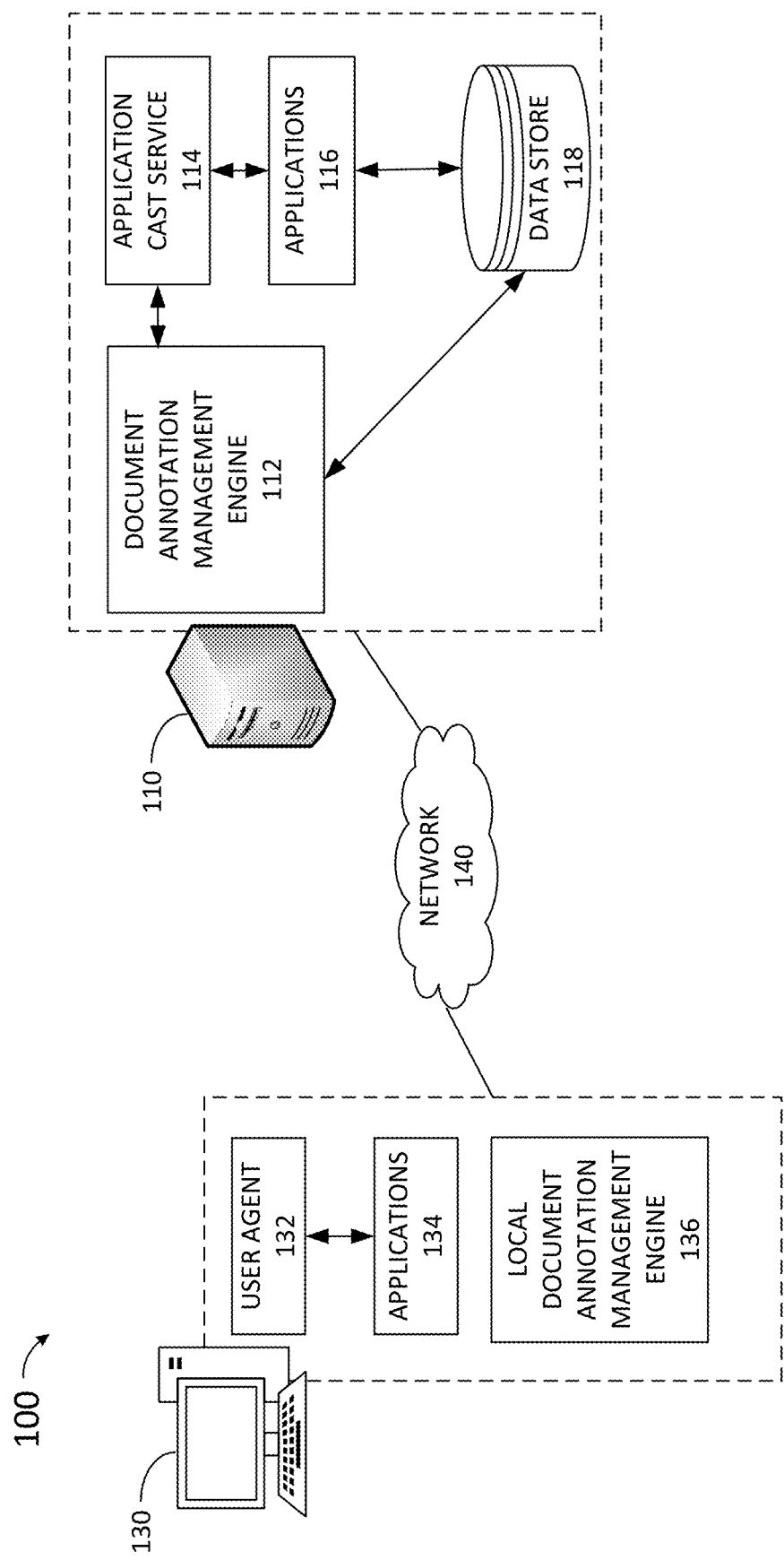

| File | Home | Insert | Design | Review | View | Help |

South Australia was established by a private Colonization Commission and didn't receive any convicts.

The Adelaide Festival, held in the capital every two years, is an international cultural event.

Frank, Lydia, and Henry ⋯ — 330
Where does this information come from?
April 25, 2022
Reply

FIG. 3D

METHOD AND SYSTEM OF MANAGING AND DISPLAYING DOCUMENT ANNOTATION SURFACES

BACKGROUND

In today's collaborative work and social computer environments, where many users contribute to creation or consumption of content remotely, providing an avenue for users to express their thoughts and opinions about contents has become increasingly important. Many applications enable users to express their opinions about contents in a document by providing a mechanism for the users to make a comment. For example, some applications enable the users to select a portion of contents in a document and invoke a user interface (UI) element for entering a comment associated with the selected portion. These comments are often shown on a separate portion of the UI screen as that of the content. For example, some applications display the comments on a comment pane that is displayed on the side of the screen.

To provide a conversation space, comments are usually associated with and owned by the comment's author. Thus, the author is normally the only user who can edit a comment or post it. Furthermore, the comment is not displayed until the user selects a post menu option. This enables the author to edit the content of the comment until they feel that the comment is ready to be posted before other users can view it. While these comment features are useful in many situations, they do not allow for real-time collaboration and do not provide a space where multiple users can collaborate on the same content.

Hence, there is a need for improved systems and methods of managing and displaying UI surfaces that enable collaboration between multiple users.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 depicts an example system upon which aspects of this disclosure may be implemented.

FIGS. 3A-3D depict example UI screens for converting annotation surfaces to different types of annotation surfaces.

SUMMARY

Figure 2A:
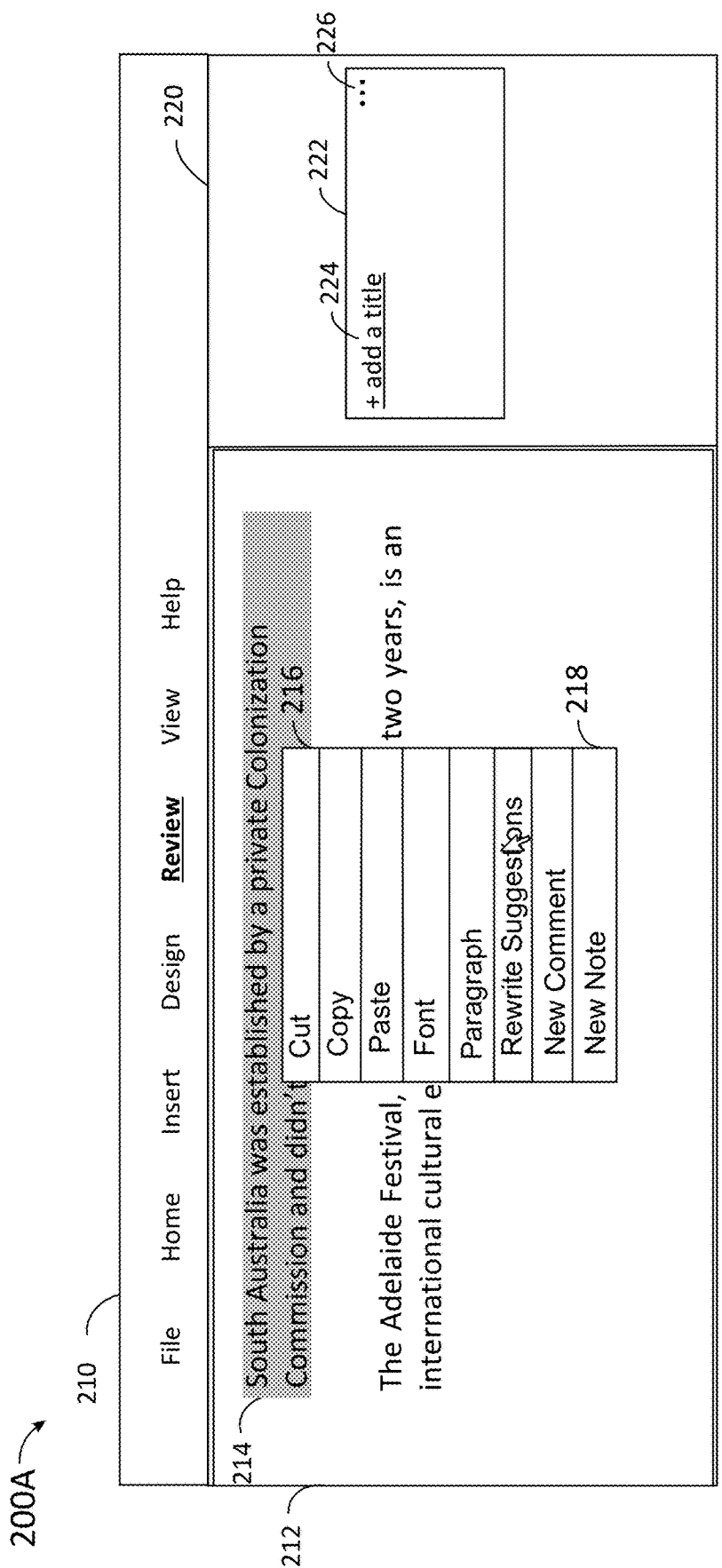
FIG. 2A-2H depict example UI screens for an application that provides document annotation management services.

In one general aspect, the instant disclosure presents a data processing system having a processor and a memory in communication with the processor wherein the memory stores executable instructions that, when executed by the processor, cause the data processing system to perform multiple functions. The functions may include receiving a request to add a note to a document, displaying a first UI surface for the note, the first UI surface including an editable surface that is editable by a plurality of users and the first UI surface enabling visibility of content to the plurality of users in real-time, receiving a request to add a conversation to the note, and upon receiving the request to add a conversation to the note, attaching a second UI surface to the first UI surface, the second UI surface being only editable by one user.

In yet another general aspect, the instant disclosure presents a method for managing annotation surfaces for a document. In some implementations, the method includes A method for managing annotation surfaces for a document includes receiving a request to add a note to a document, displaying a first UI surface for the note, the first UI surface including an editable surface that is editable by a plurality of users and the first UI surface enabling visibility of content to the plurality of users in real-time, and attaching a second UI surface to the first UI surface, the second UI surface being a UI surface for a comment and the second surface UI surface requiring user action for posting the comment.

In a further general aspect, the instant application describes a data processing system having a processor and a memory in communication with the processor wherein the memory stores executable instructions that, when executed by the processor, cause the data processing system to perform multiple functions. The functions may include displaying a first UI surface for annotating a document, the first UI surface including an editable surface that is editable by a plurality of users and the first UI surface enabling visibility of content to the plurality of users in real-time, receiving a request to convert the first UI surface to a conversation UI surface, and upon receiving the request to convert the first UI surface to the conversation UI surface; converting the first UI surface to a second UI surface, the second UI surface being a UI surface for a comment and the second surface UI surface requiring user action for posting the comment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Commenting on content has become an increasingly useful tool in collaborative work environments. For example, users, who are working on the same document from different geographical locations and/or at different times, may annotate a document by posing questions, expressing their opinions and/or suggesting edits for one or more segments of the content in the document. In another example, a viewer reviewing a work product may comment on various segments of the work product. To generate a comment, the user can often select a content segment within a document and then utilize a feature (e.g., menu button) of the application associated with the document to display a text box into which they can enter their input. The users can take their time entering and/or editing the input, until they feel that the input is ready for display, at which point, the users can utilize a UI menu option (e.g., a post menu button) to post the comment. Once the comment is posted, it is displayed on the document and may be displayed to other users who view the document. The posted comment is associated with the author and may include an indicator that identifies the author (e.g., the name and/or thumbnail picture of the author is displayed on the comment surface). Moreover, the content of the comment is normally only editable by the user who authored it. Other users may utilize a reply option to post a separate but associated response to the original comment, but they cannot edit the original comment. While this provides a conversation space for multiple users to communicate and as such is very useful, it does not enable the users to collaborate in real-time. Nor does it enable users to directly collaborate on the content of the comment by adding to it or editing it, when needed. As such, there exists a technical problem of lack of adequate mechanisms for providing a UI surface that enables collaboration in real time between multiple users, enables the users to edit the content of annotations made on a document and/or enables different users to provide individually posted responses to an original editable annotation.

Moreover, current mechanisms for displaying comments do not provide a manner in which the user can switch between an editable annotation surface and a non-editable annotation surface. For example, if a user posts a comment and then decides later that it would be beneficial to allow other users to edit the comment, they cannot convert their comment to a note. Similarly, if a user posts a note and then realizes that the annotation would have been more appropriate as a comment, they will need to delete their note and post a new comment. As such, there exists another technical problem of lack of mechanisms for enabling conversion between comments and notes in documents.

To address these technical problems and more, in an example, this description provides technical solutions for displaying a UI surface for annotating documents that is visible in real-time collaborations and is editable by multiple users, the UI surface being adjacent to another UI surface for annotating documents that requires specific user action for posting the content. This provides an improved collaboration and content-creation UI that offers document annotation in the form of notes with attached conversations in which notes provide surfaces that are visible in a real-time collaboration scenario without the need to use a post functionality and can be attached to thread conversations that are in the form of comments. This enables multiple users to edit the content of the note, and to view another user's edits to the note surface in real time without the need for the editing user to utilize a post functionality, while at the same time enabling users to engage in conversations about the note outside of the note surface. In this manner, users can ask questions and make comments about the note in attached comment surfaces, while contributing to the content of the note, editing or highlight a portion of the note within the note surface. In some implementations, a note surface can be converted to comment surface and vice versa to provide additional flexibility. For example, a comment surface may be converted to a note surface to allow others to contribute to the note. In this manner, the technical solutions offer improved UI interfaces that enable collaboration and annotation of a document in a variety of different manners.

The technical solution described herein addresses the technical problem of inadequate and/or inefficient mechanisms for annotating the content of a document in a collaborative manner. The technical solution allows a user to choose the type of surface conducive to the user's need for providing annotations on a document and to convert between different types of surface as the user's needs change. Furthermore, the technical solution offers an annotation surface that provides the advantages of both note surfaces and comment surfaces by providing a note surface to which comment surfaces can be attached. The benefits made available by these technology-based solutions provide a user-friendly mechanism for displaying and managing document annotation surfaces. The technical effects at least include (1) improving the efficiency and ease of use of user collaboration mechanisms for annotating and/or editing documents; (2) improving the UI screen of productivity applications by providing a mechanism for attaching conversations to editable note surfaces; and (3) increasing UI screen size efficiency by eliminating the need to have separate editable note surfaces and conversation surfaces.

FIG. 1 illustrates an example system 100, upon which aspects of this disclosure may be implemented. The system 100 may include a server 110 which may be connected to or include a data store 118 which may function as a repository in which data relating to notes, comments, documents and/or applications 116 may be stored. Although shown as a single data store, the data store 118 may be representative of multiple storage devices and data stores which may be connected to each of the various elements of the system 100. Moreover, the server 110 may include a plurality of servers that work together to deliver the functions and services provided by each service or application. The server 110 may operate as a cloud-based server for offering document annotation management services in one or more applications such as applications 116 and/or applications 134. The server 110 may also operate as a shared resource server located at an enterprise accessible by various computer client devices such as client device 130.

The server 110 may include and/or execute a document annotation management engine 112 which may provide note and/or comment management services for users utilizing an application on their client devices such as client device 130 or utilizing online applications such as applications 116. In some implementations, the document annotation engine 112 is a part of the applications 116 or is a service that operates with the applications 134. The document annotation engine 112 may receive a request to create a new note for a document. The request may contain information about the document for which the note is requested, a content portion of the document to which the note relates, user information about the user making the request (e.g., user ID, user's name, etc.) and/or the date and time at which the note is being created. The request may be received from the application cast service 114 or directly from the applications 116 or applications 134.

The document annotation engine 112 may create a new note based on the request and provide the display data for the new note either directly or via the application cast service 114 to the applications 116/134. The note may be stored along with data associated with the note (e.g., metadata such as user ID of the user creating the note or editing the note) with the document and/or in a dataset associated with the document. In an example, the note data and/or the document may be stored in the data store 118. Display data for the note may include UI surface that is editable by a plurality of users and changes to which are posted in real-time without the need to utilize a post functionality.

Once the note display data is provided to the applications 116/134 and the note is displayed on the document, a user may utilize a UI element to edit the content of the note. Edits made to the note may be displayed in real-time to a plurality of users who are collaborating on the document (e.g., have the document open). After the note is created, the same or a different user may submit a request to attach a conversation to the note. The request may be transmitted from the applications 116/134 to the document annotation management engine 112 and may include data related to the request such as user information about the user making the request (e.g., user ID, user's name, etc.) and/or the date and time at which the request is being received. Upon receiving the request, the document annotation management engine 112 may provide display data for a conversation surface (e.g., a reply comment) to the applications 116/134. The conversation surface may be attached to the note surface such that conversations associated with the note are attached to and/or displayed adjacent to the note. In some implementations, the conversation surface is displayed below the note surface. The conversation surface may provide a surface for one user (e.g., the user making the request to create the conversation) to provide a comment. This conversation surface may only be editable by one user and may require specific user action for posting the content of the surface. This may include a post comment menu button and/or utilizing the enter key on a keyboard and the like. In some implementations, when a new note surface is created, a blank conversation surface is automatically attached to the note surface to enable a user to directly enter input into the blank conversation surface and create a conversation associated with the note.

In some implementations, after a note is created for a document and content for the note is provided, the note is saved is stored along with note data and the content of a document. The note data may include content of the note (e.g., alpha numeral text, emoticons, multimedia data, characters and the like), an identifier for the user who provided the comment note (e.g., user ID), an identifier for the content portion to which the comment note relates (e.g., a paragraph ID, sentence ID, table ID, image ID, etc.), a date/time at which the comment note was received, and/or information about any attached conversations to the note. Some or all of this data may be stored as metadata along with the document content when the document is stored.

The document annotation management engine 112 may also enable conversation of a note surface to a conversation surface and vice versa. This may be achieved by receiving a user request to convert a note surface to a conversation surface, retrieving data related to the note surface such as user ID data about all of the users who have edited the note surface and utilizing the data to convert the note surface to a conversation surface. The new conversation surface may display the content of the note and may also depict identification information about the users who edited the note surface (e.g., names of all users, thumbnail pictures of all users, etc.) and/or a date/time at which the note was edited. The date/time may be the date and/or time at which the note was created or the date and/or time at which the note was last edited. The converted surface may be non-editable and may include any conversation threads that were previously attached to the note. To convert a comment surface to a note surface, the document annotation management engine 112 may make the surface editable by multiple users, may remove a post menu option, and may make edits to the surface available/viewable in real-time.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 116 or applications 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

The client device 130 may include one or more applications 134. Each application 134 may be a computer program executed on the client device that configures the device to be responsive to user input to allow a user to view, edit, and prepare content, and/or provide and review document annotations such as notes and/or comments on a document. Data from applications 134 may be provided via the network 140 to the document annotation management engine 112, either directly or via the application cast service 114, for processing. In some implementations, the applications 134 includes a local document annotation management engine 136 for local processing and management of document annotations. The local document annotation management engine 136 may operate in a similar manner as that of document annotation management engine 112 at the local level. the Examples of suitable applications 134 include but are not limited to a productivity application (e.g., Microsoft® Word, Microsoft® Excel, etc.), fluid collaborative work environment (e.g., Microsoft® Loop), presentation application (e.g., Microsoft® PowerPoint®), a document editing application, and the like.

In some examples, applications used to provide and display document annotation surfaces are executed on the server 110 (e.g., applications 116) and are provided via an online service. In some implementations, web applications communicate via the network 140 with a user agent 132, such as a browser, executing on the client device 130. The user agent 132 may provide a user interface that allows the user to interact with applications 116 and may enable applications 116 to provide data to the document annotation management engine 112 for processing via the application cast service 114. In other implementations, the applications 116 may directly communicate with the document annotation management engine 112.

FIG. 2A-2H depict example UI screens for an application that provides document annotation management services. The UI screen 200A of FIG. 2A may for example be displayed by a productivity application such as word processing application (e.g., Microsoft Word®) displaying an example document that allows users to generate word documents. In an example, the UI screen 200A of the application may include a toolbar menu 210 that may display multiple tabs each of which may provide multiple UI elements for performing various application features. For example, the toolbar menu 210 may provide options for the user to perform one or more tasks to create or edit the document. The UI screen 200A may also include a content pane 212 which may contain content. The content may be displayed to the user for viewing and/or editing purposes. For example, the user may utilize an input device (e.g., a keyboard) to insert input such as text into the contents pane 212.

As the user creates, edits and/or reviews the content of the content pane 212, the user may be able to select a portion of the content for annotation. To select a portion of the content, the user may be able to click and drag a pointer to highlight the selection. In some implementations, the content portion is selected when the user utilizes a pointer to hover over a content portion such as the content portion 214. Once a selection is made, the selected portion may be highlighted to indicate the selection. Other methods of selecting a content portion may also be utilized.

After a content portion is selected, a UI element such as the UI element 218 may be utilized to send a request for creating a new note. In some implementations, the UI element is provided as part of the toolbar menu (e.g., under the Review tab). Additionally and/or alternatively, the UI element may be provided as part of a context menu 216 which may be displayed upon right-clicking on the selected content portion. Other mechanisms for invoking the display of a UI element for creating a new note may also be utilized. The context menu 216 may include a menu option 218 for invoking the creation of a new note.

Upon selection of the UI element 218, an annotation surface 222 may be displayed on the UI screen 200A. The annotation surface 222 may be displayed in an annotation pane 220 which may be displayed on one side of the UI screen 200A. The annotation pane 220 may be used to display one or more annotations (e.g., notes and/or comments) made on the document. The annotation surface 222 may be an expandable input box that allows the user to enter characters, emoticons, tables and/or other types of input data into the box. The annotation surface may be editable by a plurality of users. Furthermore, any edits made to the annotation surface (e.g., any input added or edited) may be viewable in real-time without the need to utilize a menu option for posting the content. For example, the content may be viewable by a plurality of users who are collaboratively working on the document.

In some implementations, the annotation surface 222 includes an indication 224 for enabling the user to enter a title for the note. The user may be able to enter the title by clicking on the indication 224 upon which an input line may be displayed for entering the title. The annotation surface 222 may also display a UI element 226 that provides additional menu options for managing the annotation surface 222, when selected.

Figure 2B:
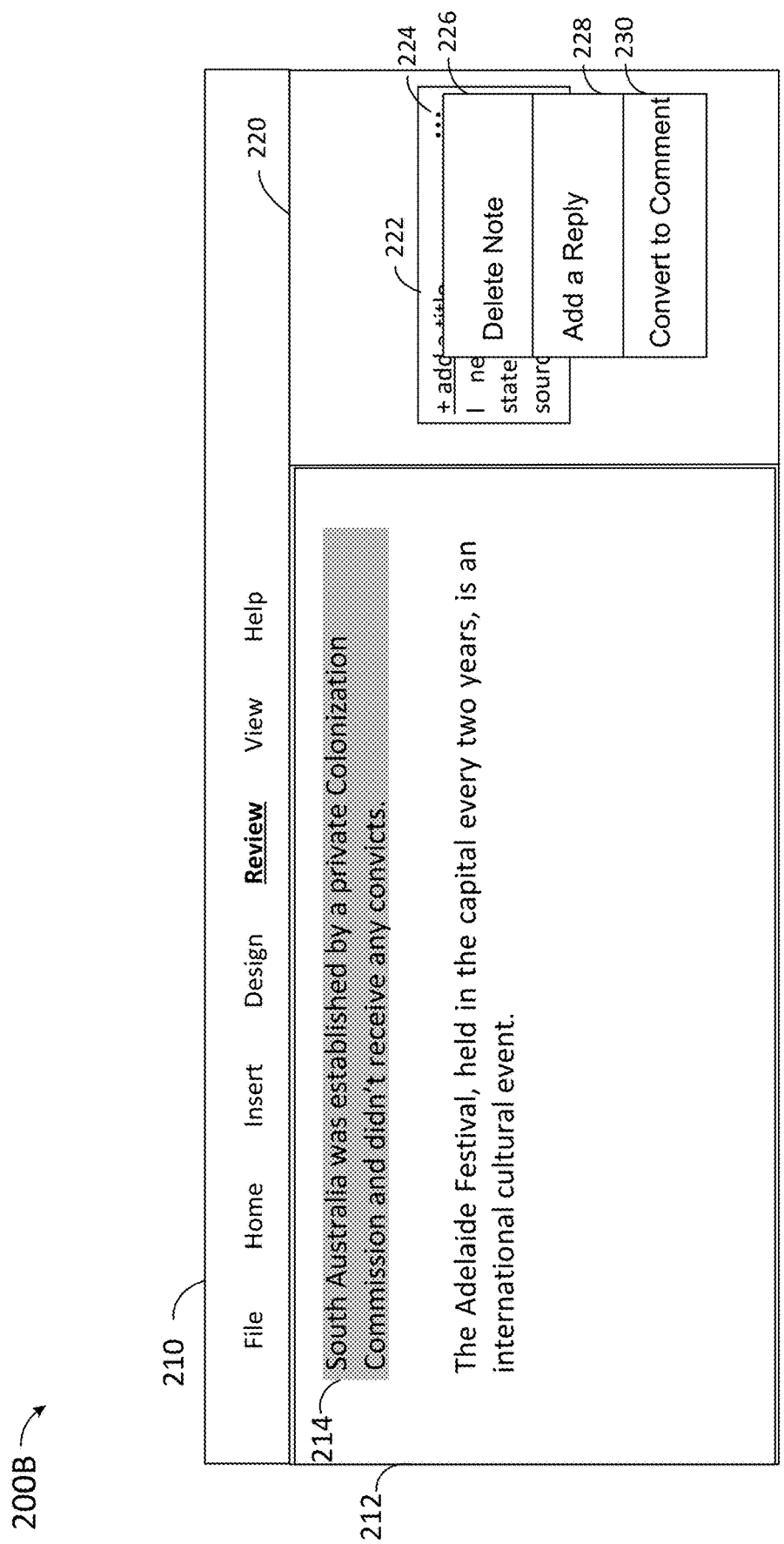
Figure 2C:
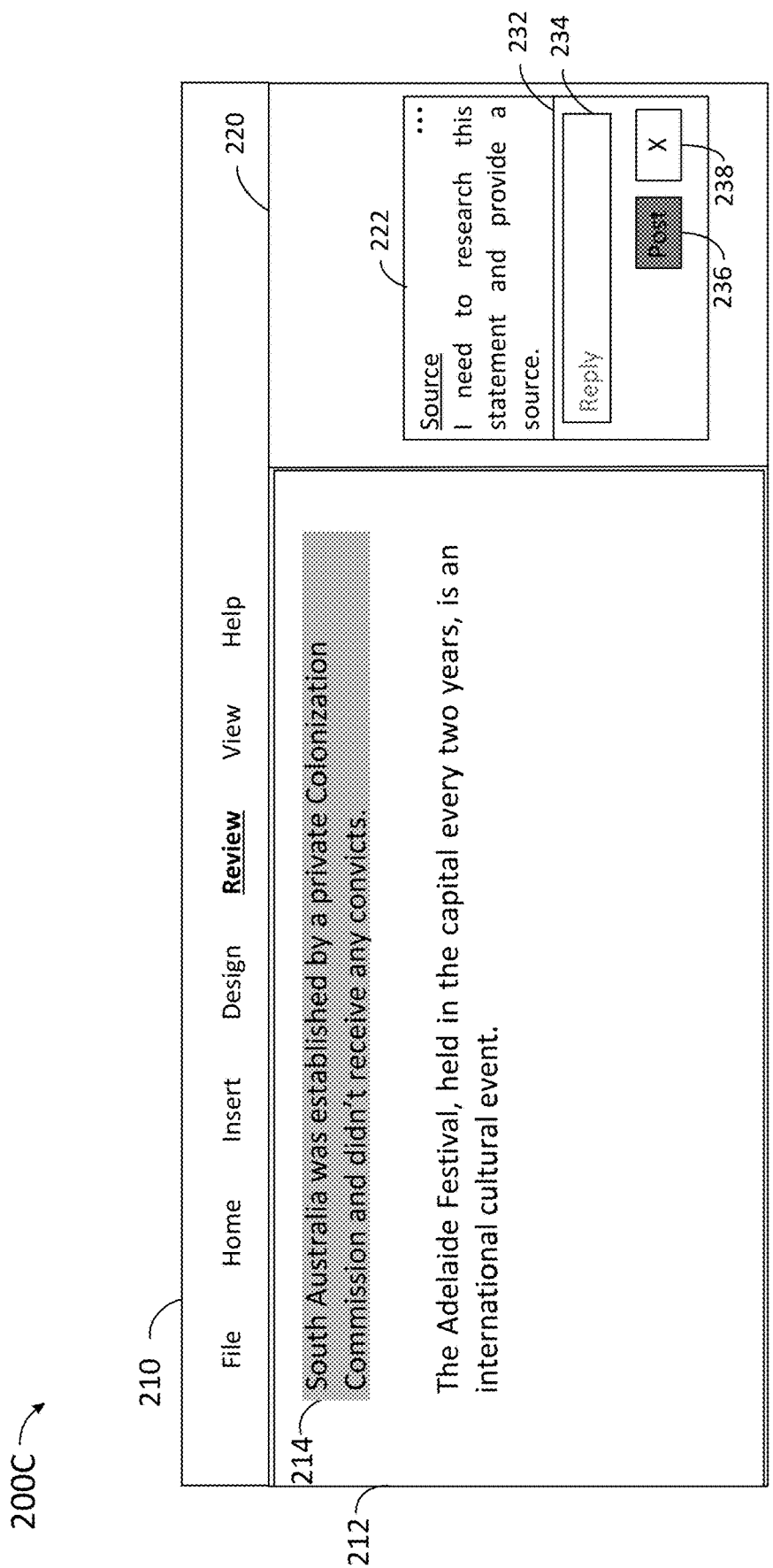
Figure 2D:
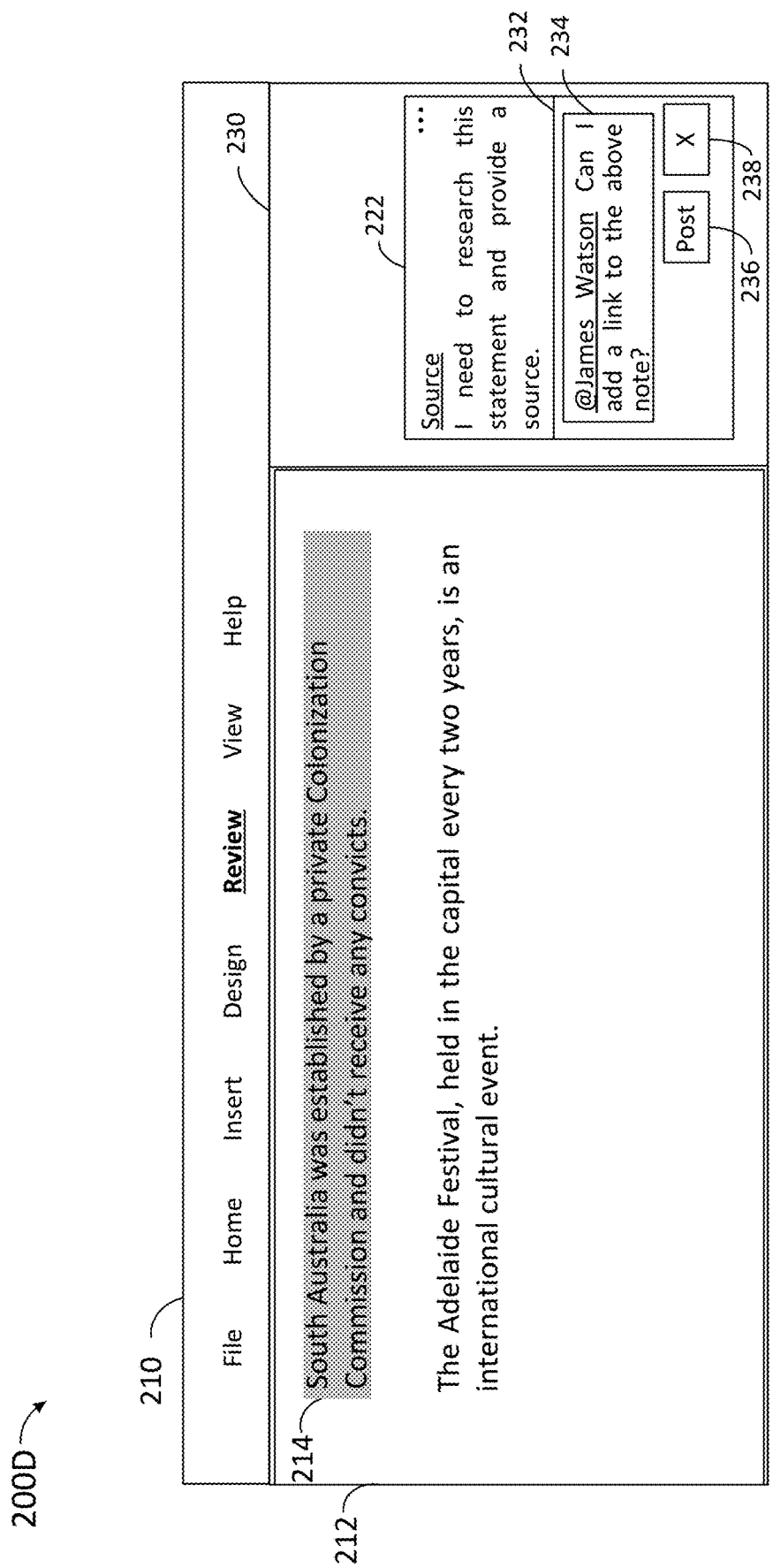
Figure 2E:
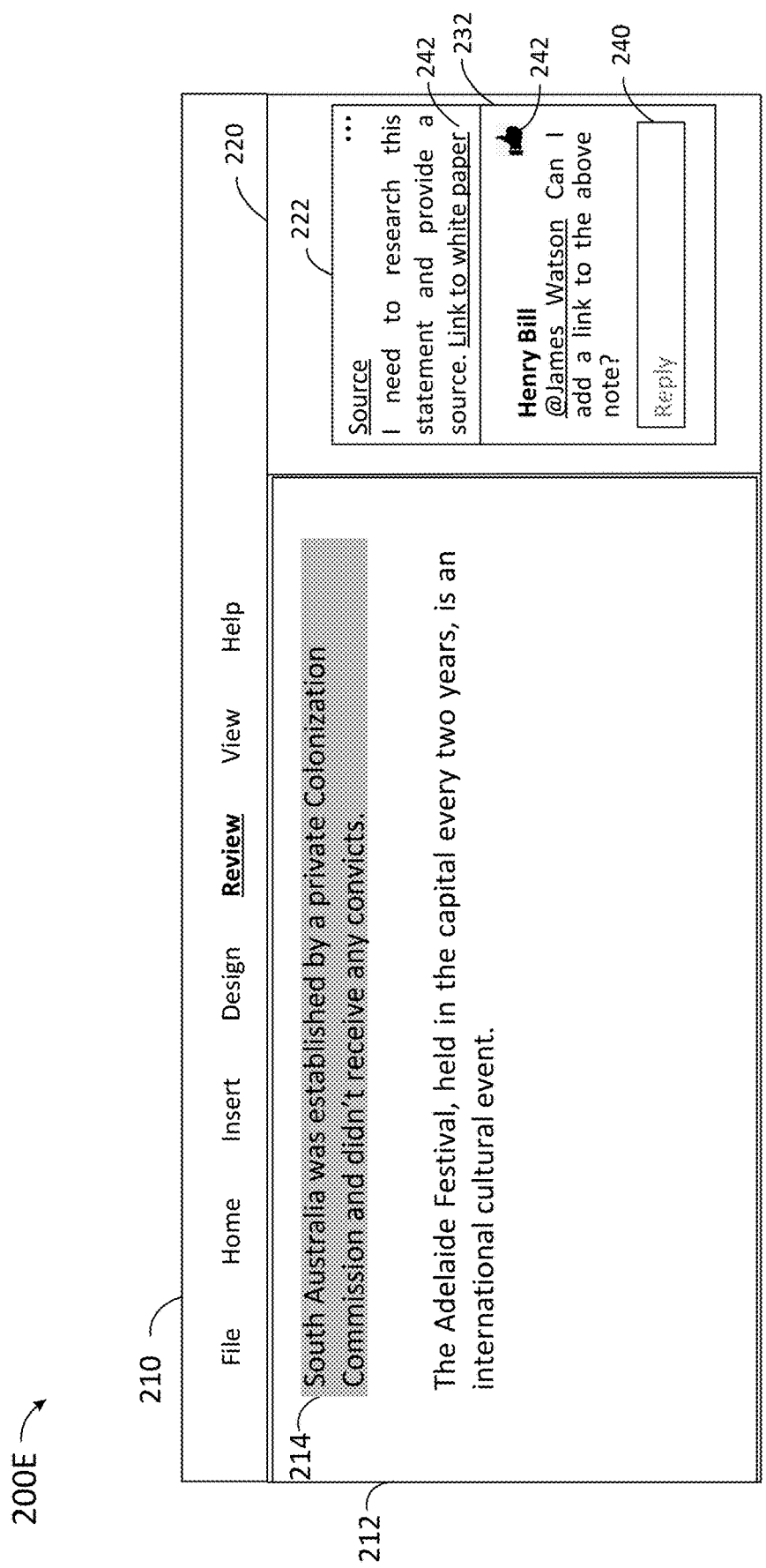

FIG. 2B illustrates an example UI screen 200B when one or more users have entered text into the annotation surface 222 and have selected the UI element 226. The UI element 226 may be selected, when a user clicks on and/or hovers over the UI element 226. Once the UI element 226 is selected, a context menu 226 may be displayed to provide menu options for managing the annotation surface 222. In some implementations, the context menu 226 is displayed, upon right-clicking on the annotation surface 222, in which case the UI element 224 may not be included. The context menu 226 may include a menu option 228 for adding a reply to the note in the annotation surface 222 and a menu option 230 for converting the note to a comment.

A user may select the menu option 228 for attaching a conversation to the annotation surface 222. Once the menu option 228 is selected, a comment surface 232 may be attached to the annotation surface 222. This is depicted in the example UI screen 200C of FIG. 2C. The comment surface 232 may include an input box 234 for receiving user input, a post menu option 236 and a cancel menu option 238. The input box 234 may be provided for entering input such as content related to the note in the annotation surface 222. In some implementations, the post menu option 236 is deactivated (e.g., not usable) until some input has been entered into the input box 234. The cancel menu option 238 may be utilized to cancel the process of creating the comment, before the comment has been posted. Thus, prior to posting the comment, selection of the menu option 238 may enable the user to remove the comment surface 232.

As depicted, the comment surface 232 may be positioned below the annotation surface 222 to enable a user to make a comment or ask a question about the content of the annotation surface 222. This may be done, when a user desires to utilize a conversation space, where comments/edits by different users and/or at different times are separated into individual comments and/or separately identifiable. A conversation space enables exchange of information/opinions in a clear manner, while the annotation surface 222 provides a collaboration space where the content can be modified by multiple users, as desired. By attaching a conversation to the annotation space 222, the technical solution provides a mechanism for enabling both types of types of collaboration/exchange of information from the same space.

After a comment surface 232 has been attached to the annotation surface 222, a user may click inside (or touch) the input box 234 to being entering an input. Once the user begins entering input, the post menu option 236 may automatically become activated to enable the user to post their comment. This is depicted in the example UI screen 200D of FIG. 2D, where the content entered into the input box 234 can be posted by selecting the post menu option 236. Prior to selecting the menu option 236, any input entered into the input box 234 is only visible to the user who is authoring the comment. Thus, as long as the post menu option 236 has not been selected any content entered into the input box 234 is not viewable by other collaborators (e.g., other users who are working on the document at the same on a different device). Furthermore, at any time before posting the comment, the user can change their mind and utilize the menu option 238 to remove the comment surface 232.

Once the user is finished entering the input data and is satisfied with the content, they may utilize the menu option 236 to post the comment. Alternatively and/or additionally, alternative mechanisms for posting the comment may be utilized. In an example, pressing the Ctrl and Enter key on the keyboard at the same time may result in posting the comment. This attaches the posted comment to the annotation surface 222, as depicted in UI screen 200E of FIG. 2E. Once the comment is posted, a new input box 240 may be displayed below the posted comment to enable further conversation. In some implementations, posting a comment also results in generation of notifications. Thus, when a new comment is attached to an annotation surface, notifications may be generated and provided to users who are collaborators on the document.

The comment surface 232 may be utilized to ask questions about or provide an opinion about the content of the note in the annotation surface 222. For example, a user may ask the author whether they are permitted to edit the note. The author may respond by utilizing the input box 240 and/or a like menu option 242. When selected, the like menu option 242 may change color and/or may generate a notification for the author of the comment. In response, the user who made the comment may edit the annotation surface 222 to add the content portion 242. Thus, while the conversation space provided by the comments may enable the users to engage in discussions, any user can also edit the content of the annotation surface 222, when desired.

Figure 2F:
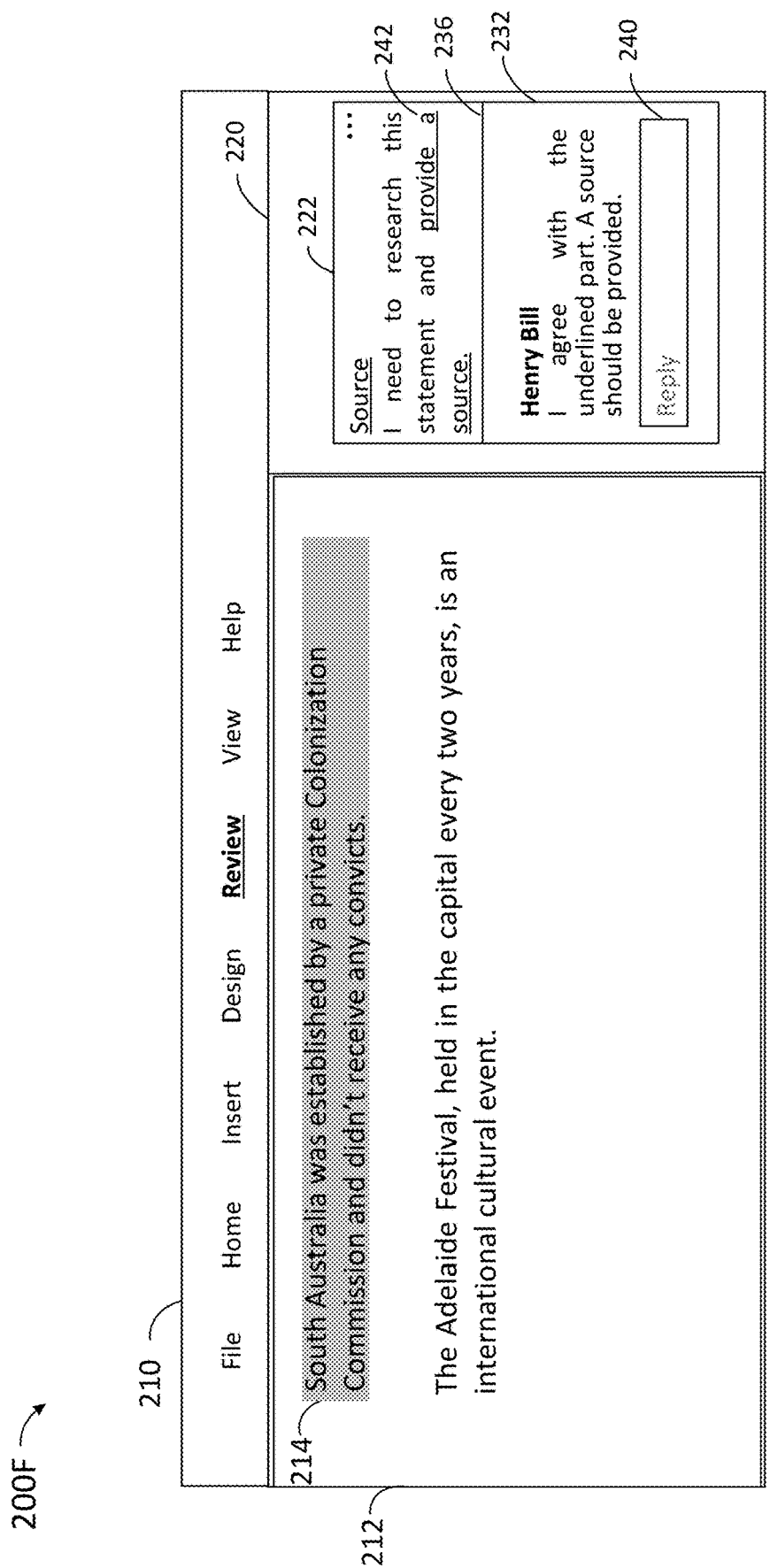

FIG. 2F depicts a UI screen 200F which illustrates an alternative example of utilizing the annotation surface 222 and comment surface 232 for collaboration. A user may edit the content of the annotation surface 222 to bring focus to a portion of the content (e.g., by underlining, highlighting, bolding and/or changing the font color of the portion). For example, the user may underline the portion 236 and discuss the edit in the comment surface 232. This provides the users with a mechanism for easily approving or disapproving one or more portions of an annotation. In another example, a user may enter a table in the annotation surface 222 and ask other users to fill in the table. The other users may then easily enter the requested information within the annotation surface and attach a comment to let others know that they filled in their portion of the table.

Figure 2G:
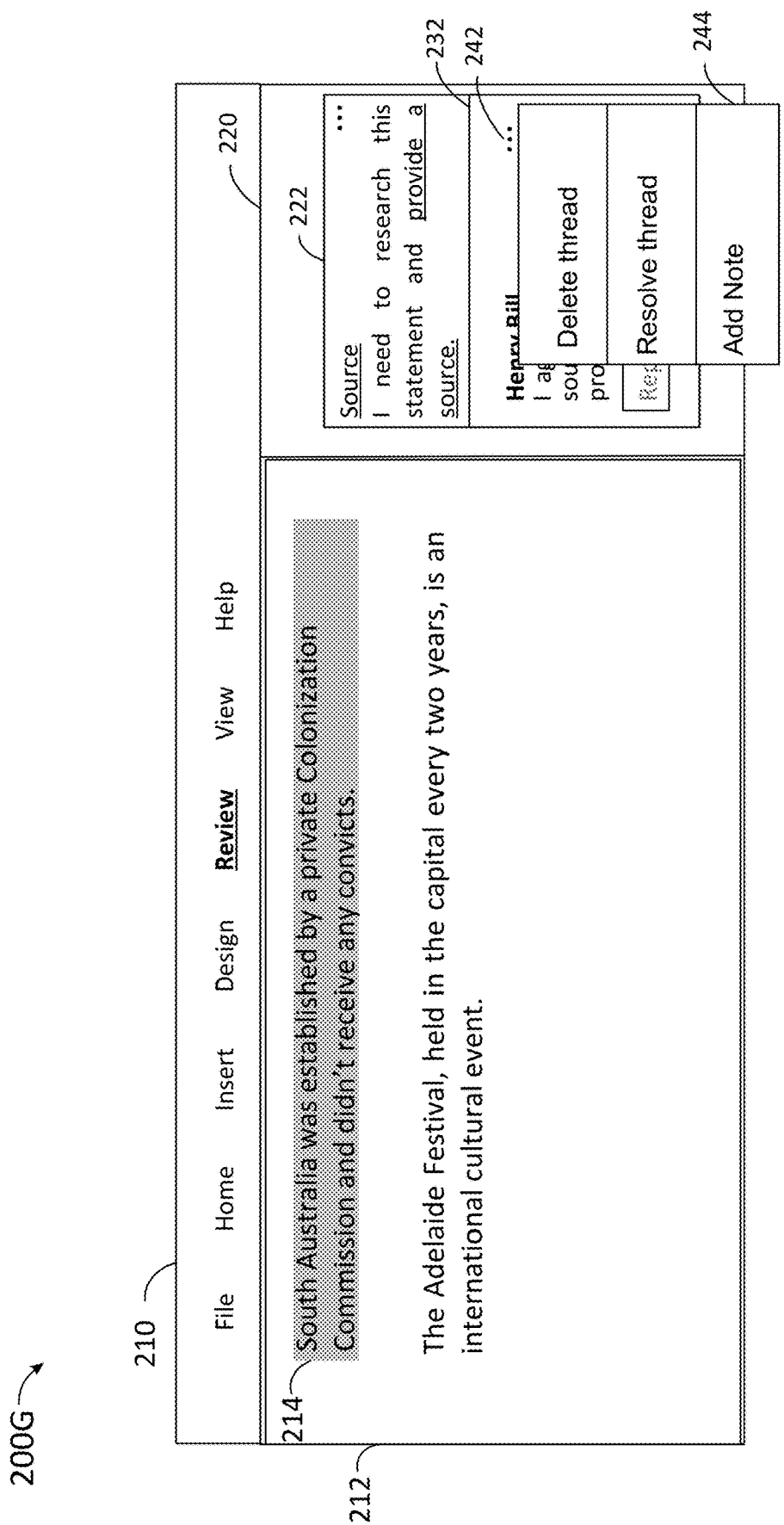
Figure 2H:
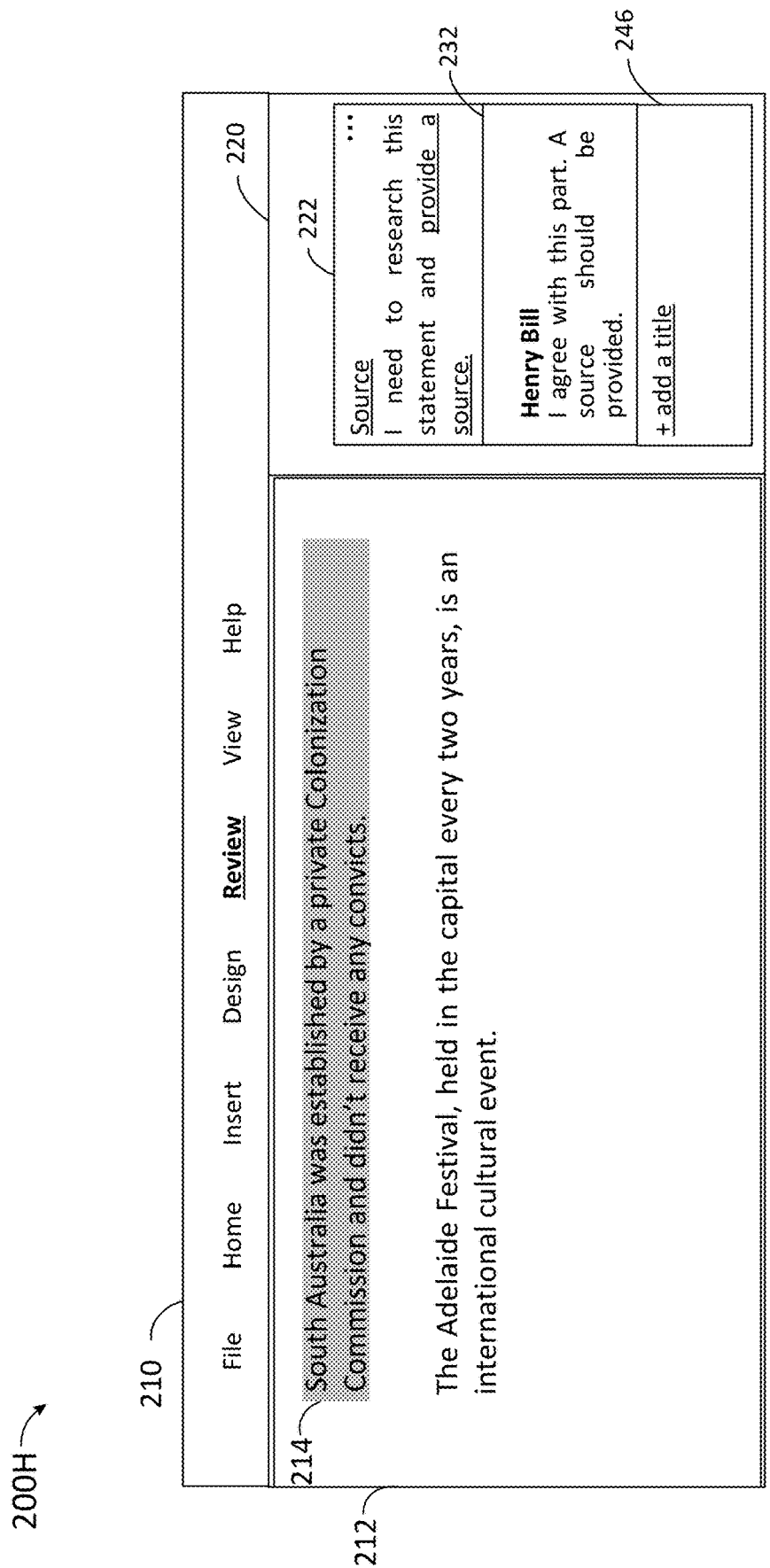

FIG. 2G depicts a UI screen 200G which illustrates an implementation in which a note surface is attached to a comment surface. Once a comment has been posted, a UI element 242 may be displayed on the comment surface 232. In some implementations, the UI element 242 is displayed upon hovering on a portion of the comment surface 232. Selecting the UI element 242 and/or right-clicking on the comment surface 232 may result in the display of a context menu 244 which provides one or more options for managing the comment. For example, options may be provided for deleting the conversation thread and/or resolving the conversation thread. Furthermore, the context menu may include a menu option 244 for attaching a note to the conversation surface 242. This may be desirable, for example, when an editable space for discussing one or more of the comments in the comment thread may be needed. Upon selection of the menu option 244, a second annotation surface 246 may be attached to the comment surface 232, as depicted in the UI screen 200H of FIG. 2H. The second annotation surface 246 may be similar to the annotation surface 222 in that the surface may be editable by a plurality of users and changes made to the content of the surface may be viewable in real-time and without a need for performing a posting operation.

FIGS. 3A-3D depict example UI screens for converting annotation surfaces to different types of annotation surfaces. The UI screen 300A of FIG. 3A displays a comment surface 310. The comment surface may include the comment content 312, a user identification 314, a date/time identifier 316 and an input box 318 for entering a reply. The user identification 316 may identify the author of the comment. The identifier may be a full name of the author. In alternative implementations, the identifier may be a first name, last name, initials, picture or other types of information that identifies the author. The comment surface may also include a UI element 320 for displaying one or more menu options for managing the comment.

Figure 3A:
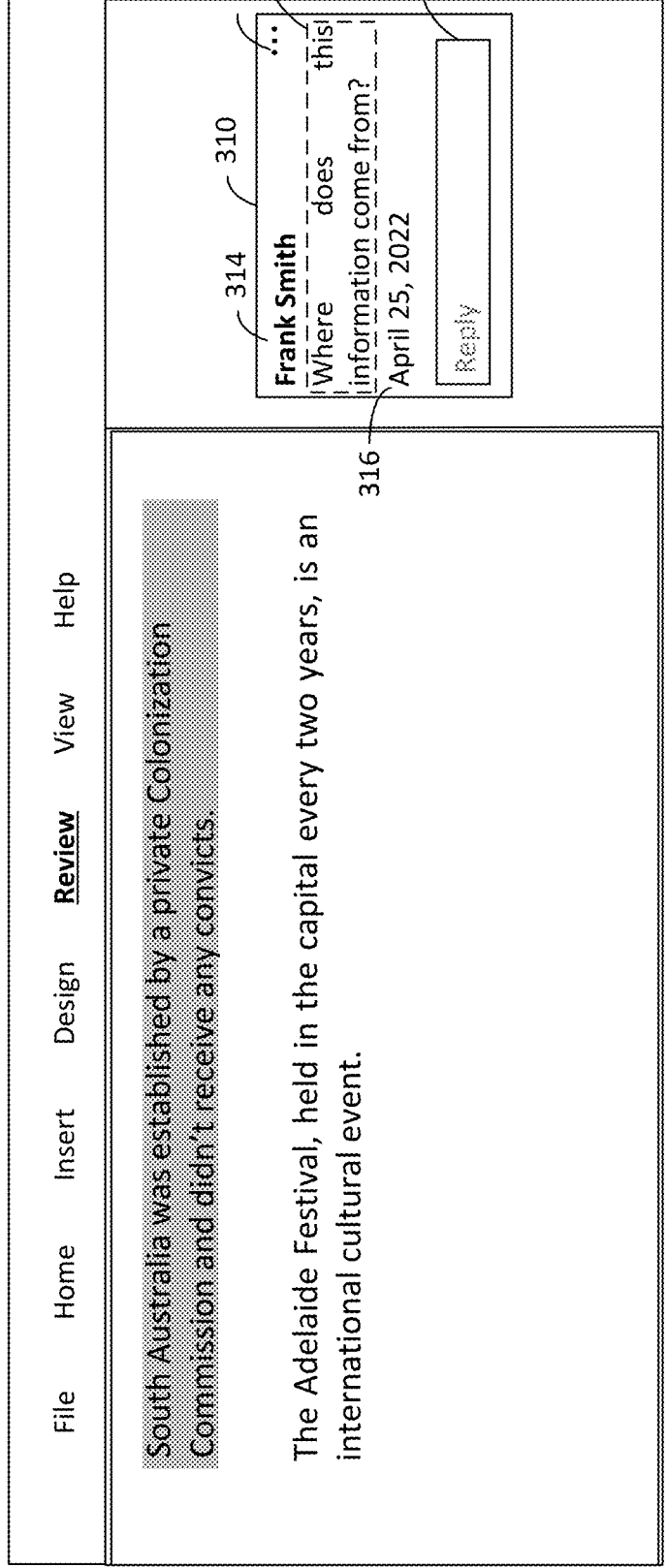
Figure 3B:
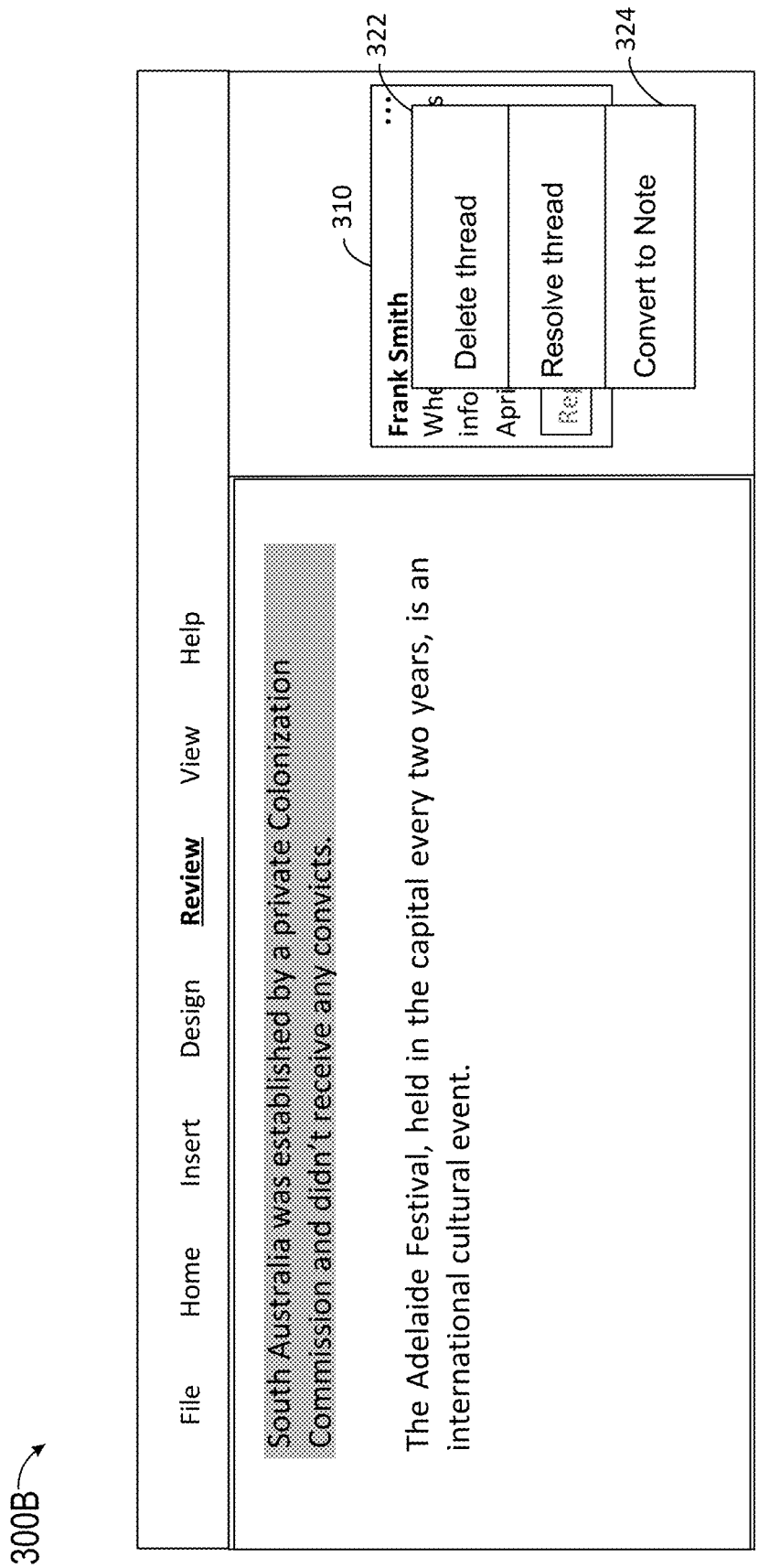
Figure 3C:
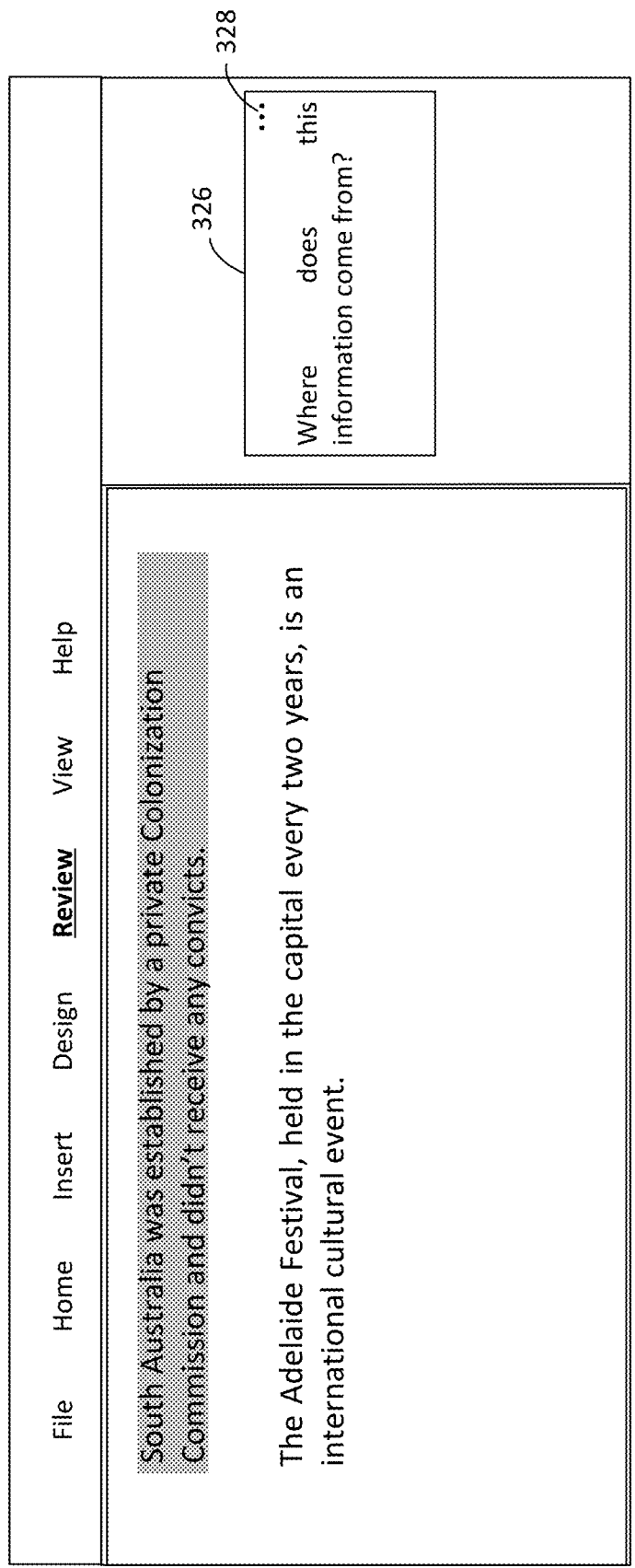

Selecting the UI element 320 and/or right-clicking on the comment surface 310 may result in the display of the context menu 322 depicted in UI screen 300B of FIG. 3B. The context menu 322 may provide one or more options for managing the comment. One of the options offered may be provided via a menu option 324 for converting the comment to a note. This enables a user to convert an annotation surface from a comment surface to a note surface. For example, after the user has entered a comment, the user may realize that this space would be better utilized if it is editable by a plurality of users. As a result, the user may select the menu option 324 to convert the comment surface 310 to a note surface. The resulting note surface 326 is depicted in UI screen 300C of FIG. 3C. To convert the comment surface 310 to the note surface 326, the application may remove the user identification information (e.g., user's name), date/time information and/or the input box. That is because since note surfaces are editable by multiple users, the author's name may not be displayed on the note surface. Furthermore, the date/time information may not be as important since the content may be edited multiple times and at different date/times. However, in some implementations, the note surface includes at least one of the user identification information and the date/time information. Moreover, in some implementations, the conversation surface (e.g., the reply input box) is automatically attached to the note surface when the note is generated.

In addition to converting a comment surface to a note surface, the technical solutions discussed herein may also provide for converting a note surface to a comment surface. This may be achieved by utilizing the UI element 328 which may provide a menu option for converting the note to a comment. The UI screen 300D of FIG. 3D depicts an example comment surface 330 which has been converted from a note surface. While a note may not display user identification information, information about the users who have edited the note may be collected and stored by the document annotation management engine or the application. This information may be used when converting the note surface to a comment surface for displaying identification information of one or more of the users who have contributed to the note. In an example, the first names of all the users who edited the note may be displayed on the comment surface 330. Furthermore, the comment surface may display a date/time. The date/time may be the date/time the note was created or the date/time the note was last edited.

Figure 4:
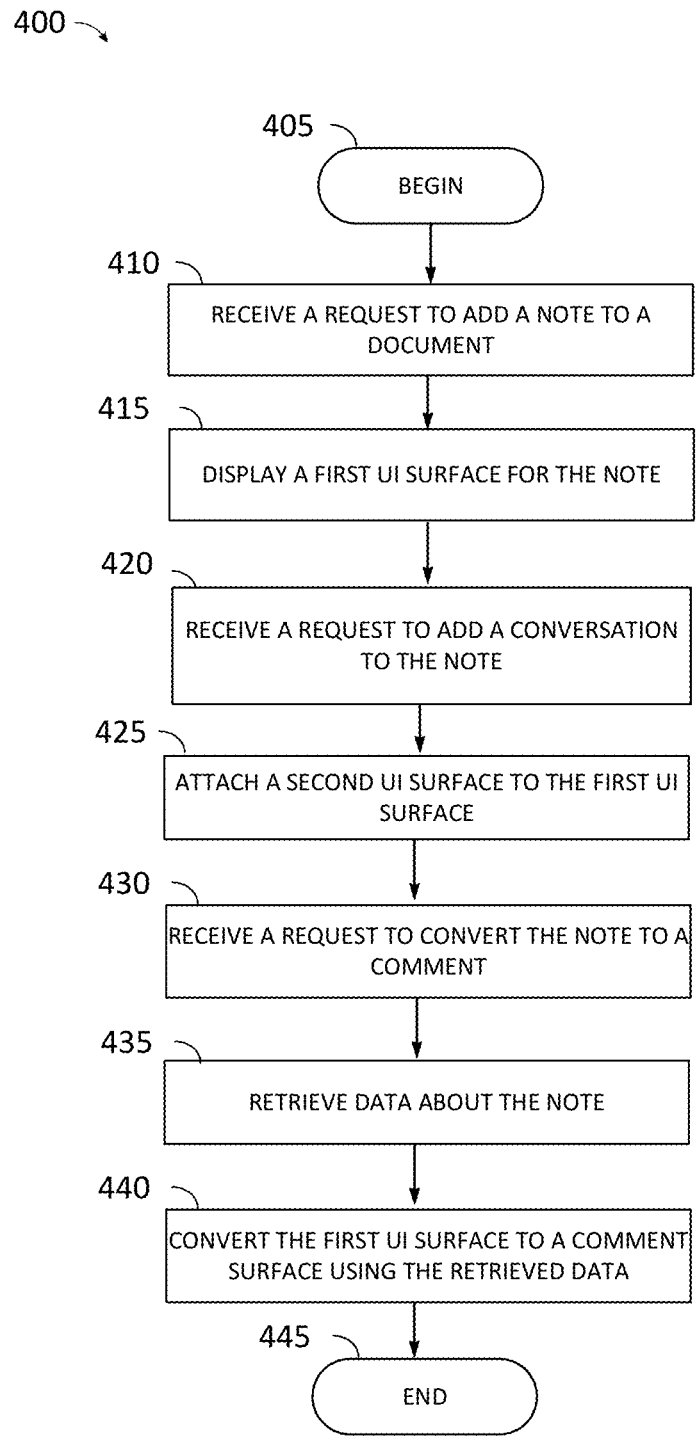
FIG. 4 is a flow diagram depicting an example method for managing and displaying annotation surfaces in a document.

FIG. 4 is a flow diagram depicting an exemplary method 400 for managing and displaying annotation surfaces in a document. One or more steps of the method 400 may be performed by a document annotation management engine such as the document annotation management engine 112 of FIG. 1 or by an application such as applications 116/134 of FIG. 1. The method 400 may begin, at 405, and proceed to receive a request to add a note to a document, at 410. This may occur, for example, when a user selects a portion of the document content and submits a request to add a note to the selected portion via a UI of an application or service that provides annotation management services. The request may be submitted via an input/output element of a client device and be transmitted via a network to the document annotation management engine. The document may be any electronic document that includes content. The content portion may be any portion of the content for which a note can be submitted.

Once the request to add the note is received, method 400 may proceed to display a first UI surface for the note, at 415. The first UI surface may be displayed on a UI screen displaying the document including and may include an editable surface that is editable by a plurality of users. Furthermore, the first UI surface may enable visibility of content to the plurality of users in real-time. This may involve not requiring any specific user actions for posting the content of the note. For example, once the UI surface is displayed on the UI screen, a user may click inside the UI surface and begin entering content for the note. The entered content may be displayed to other users who have the document opened in a collaborative work environment while the first user is entering the content. Once the first user is done entering the content, the user may simply click away from the UI surface and the entered content may remain displayed within the UI surface.

After the first UI surface has been displayed, method 400 may receive a request to attach a conversation to the note, at 420. The request may be received via a UI element associated with the first UI surface. For example, the request may be submitted by selecting a menu option for adding a comment to the note. This may occur, when a user desires to have a separate conversation outside of the note. The conversation may relate to the content of the note. For example, the user may desire to ask a question about the content of the note and/or may wish to make their approval or disapproval of a portion of the note content known.

Once the request is received, method 400 may proceed to attach a second UI surface to the first UI surface, at 425. In some implementations, this involves creating a comment UI surface and anchoring the comment UI surface to the note UI surface. The second UI surface may be displayed below the first UI surface and may be only editable by one user (e.g., the user who submitted the request for creating the comment). Furthermore, the second UI surface may require specific user action for posting its' content. For example, the second UI surface may include a menu option for posting the content. The user may then begin entering content within the second UI surface, but the content may not be viewable by other users until the user has taken specific action to post the content. Moreover, the second UI surface may display the name of the user editing the content and/or the time at which the comment was created. In some implementations, the second UI surface is automatically attached to the first UI surface without the need to receive a user request to do so. In such implementations, when the first UI surfaces is created for a note, a second UI surface for enabling conversations is attached to the first UI surface before the surfaces are displayed.

In some implementations, each of the note surface can be converted to a comment surfaces and vice versa. As such, method 400 may receive a request to convert the first UI surface to a comment UI surface, at 430. Upon receiving the request, method 400 may proceed to retrieve data about the first UI surface, at 435. The data may include data about the content of the note such as an identifier for the users who have edited the content, the time/date the note was created and edited, and/or the content portion to which the note is related. Method 400 may then utilize the retrieved data to convert the first UI surface to comment surface using the retrieved data, at 440, before ending at 445. For example, the comment surface may display identification information for one or more users that edited the note and/or the last time/date at which the note was edited or the time/date at which the note was created.

Figure 5:
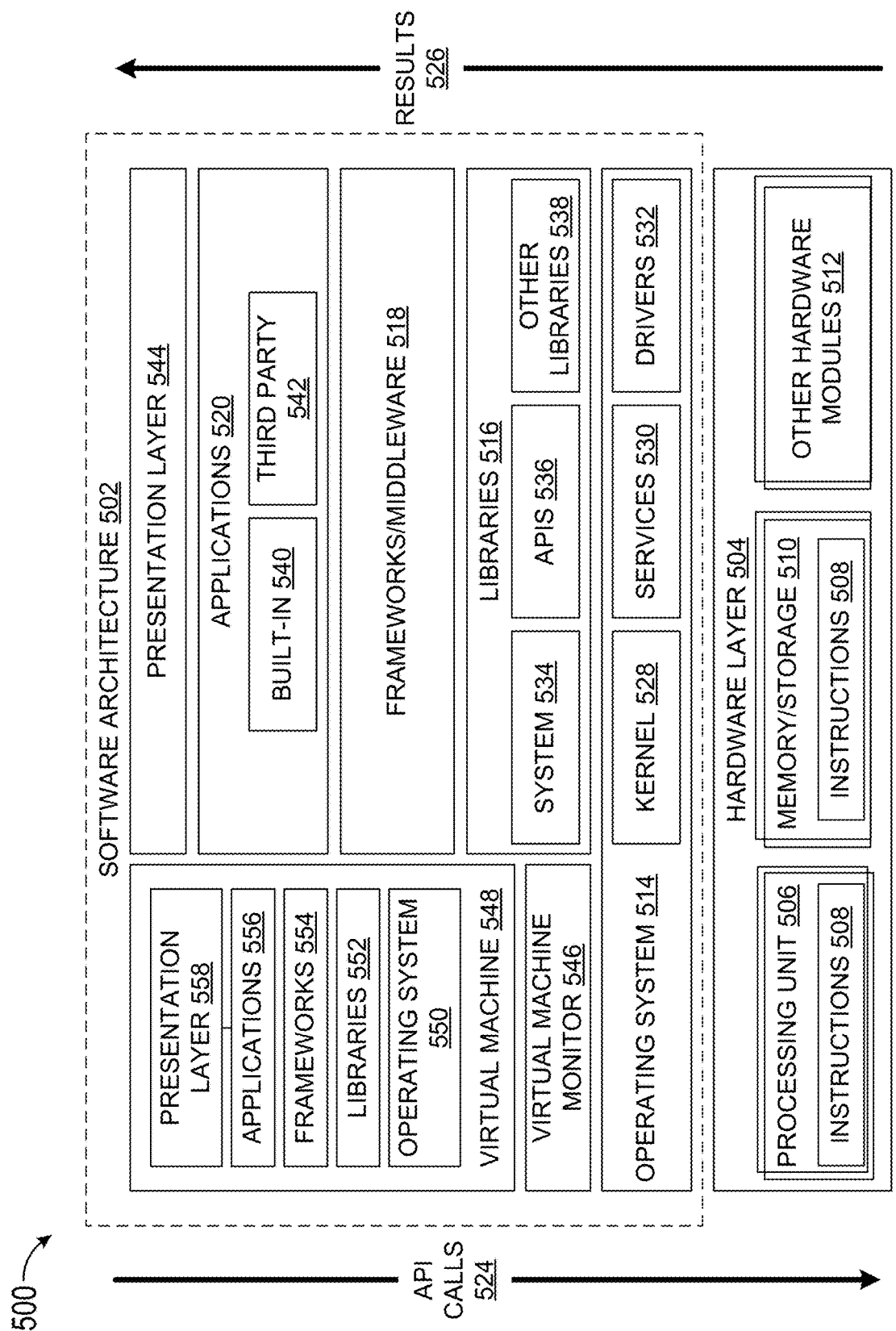
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
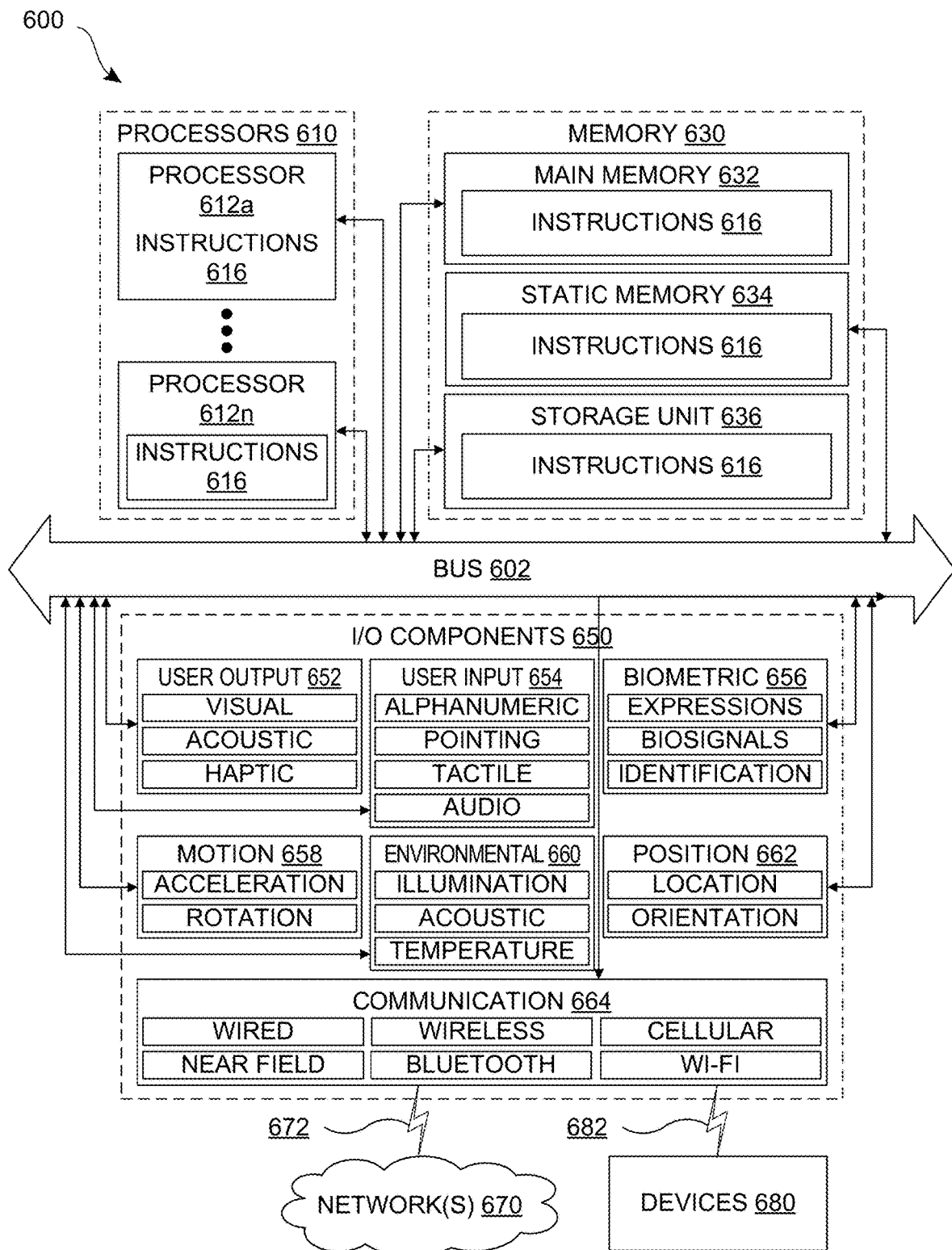
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving a request to add a note to a document;
    displaying a first user interface (UI) surface for the note, the first UI surface including an editable surface that is editable by a plurality of users and the first UI surface enabling visibility of content to the plurality of users in real-time;
    receiving a request to add a conversation to the note; and
    upon receiving the request to add a conversation to the note, attaching a second UI surface to the first UI surface, the second UI surface being only editable by one user.

Item 2. The data processing system of item 1, wherein the first UI surface provides a surface for annotating the document.

Item 3. The data processing system of any of items 1 or 2, wherein the note is associated with a selected portion of content of the document.

Item 4. The data processing system of any preceding item, wherein the second UI surface is a comment surface for replying to the content of the first UI surface.

Item 5. The data processing system of any preceding item, wherein the second UI surface includes a UI element for posting the conversation.

Item 6. The data processing system of any preceding item, wherein the first UI surface automatically posts the content and the second UI surface requires specific user action for posting the conversation.

Item 7. The data processing system of any preceding item, wherein the memory comprises executable instructions that, when executed by processor, further cause the data processing system to perform functions:
receiving a user request to convert the note to a comment;
retrieving data about the note; and
converting the first UI surface to a third UI surface by using the retrieved data, the third UI surface being editable by only one user.

Item 8. The data processing system of item 7, wherein the data includes identification information for one or more users who edited the note and the third UI surface displays the identification information.

Item 9. A method for managing annotation surfaces for a document comprising:
receiving a request to add a note to the document;
displaying a first user interface (UI) surface for the note, the first UI surface including an editable surface that is editable by a plurality of users and the first UI surface enabling visibility of content to the plurality of users in real-time; and
attaching a second UI surface to the first UI surface, the second UI surface being a UI surface for a comment and the second surface UI surface requiring user action for posting the comment.

Item 10. The method of item 9, wherein the first UI surface automatically posts the content without requiring any user action for posting the content.

Item 11. The method of any of items 9 or 10, wherein the second UI surface is only editable by one user.

Item 12. The method of any of items 9-11, wherein the note is associated with a selected portion of content of the document.

Item 13. The method of any of items 9-12, wherein the second UI surface is a comment surface for replying to the content of the first UI surface.

Item 14. The method of any of items 9-13, wherein the second UI surface includes a UI element for posting the comment.

Item 15. The method of any of items 9-14, further comprising:
receiving a user request to convert the first UI surface to a comment UI surface;
retrieving data about the note; and
converting the first UI surface to a third UI surface by using the retrieved data, the third UI surface being editable by only one user.

Item 16. The method of item 15, wherein the data includes identification information for one or more users who edited the note and the third UI surface displays the identification information.

Item 17. A data processing system comprising:
a processor; and
a memory in communication with the processor, the memory comprising executable instructions that, when executed by the processor, cause the data processing system to perform functions of:
displaying a first user interface (UI) surface for annotating a document, the first UI surface including an editable surface that is editable by a plurality of users and the first UI surface enabling visibility of content to the plurality of users in real-time;
receiving a request to convert the first UI surface to a conversation UI surface; and
upon receiving the request to convert the first UI surface to the conversation UI surface; converting the first UI surface to a second UI surface, the second UI surface being a UI surface for a comment and the second surface UI surface requiring user action for posting the comment.

Item 18. The data processing system of item 17, wherein the first UI surface is a note and the note is associated with a selected portion of content of the document.

Item 19. The data processing system of any of items 17 or 18, wherein the first UI surface automatically posts the content without requiring any user action for posting the content.

Item 20. The data processing system of any of items 17-20, wherein the second UI surface displays user identification information for one or more users who edited the content.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving a request to add a note to a document;
   displaying a first user interface (UI) surface for the note, the first UI surface including an editable surface that is editable by a plurality of users and the first UI surface enabling visibility of content to the plurality of users in real-time;
   receiving a request to add a conversation to the note; and
   upon receiving the request to add a conversation to the note, creating a second UI surface and displaying the second UI surface adjacent to the first UI surface, the second UI surface being only editable by one user,
   wherein the first UI surface and the second UI surface are surfaces for entering annotations, and the first UI surface is a different type of annotation surface than the second UI surface.

2. The data processing system of claim 1, wherein the first UI surface provides a surface for annotating the document.

3. The data processing system of claim 1, wherein the note is associated with a selected portion of content of the document.

4. The data processing system of claim 1, wherein the second UI surface is a comment surface for replying to the content of the first UI surface.

5. The data processing system of claim 1, wherein the second UI surface includes a UI element for posting the conversation.

6. The data processing system of claim 1, wherein the first UI surface automatically posts the content and the second UI surface requires specific user action for posting the conversation.

7. The data processing system of claim 1, wherein the memory comprises executable instructions that, when executed by processor, further cause the data processing system to perform functions:
   receiving a user request to convert the note to a comment;
   retrieving data about the note; and
   converting the first UI surface to a third UI surface by using the retrieved data, the third UI surface being editable by only one user.

8. The data processing system of claim 7, wherein the data includes identification information for one or more users who edited the note and the third UI surface displays the identification information.

9. A method for managing annotation surfaces for a document comprising:
   receiving a request to add a note to the document;
   displaying a first user interface (UI) surface for the note, the first UI surface including an editable surface that is editable by a plurality of users and the first UI surface enabling visibility of content to the plurality of users in real-time; and
   creating a second UI surface and displaying the second UI surface adjacent to the first UI surface, the second UI surface being a UI surface for a comment and the second UI surface being only editable by one user,
   wherein the first UI surface and the second UI surface are surfaces for entering annotations, and the first UI surface is a different type of annotation surface than the second UI surface.

10. The method of claim 9, wherein the first UI surface automatically posts the content without requiring any user action for posting the content.

11. The method of claim 9, wherein the second UI surface requires user action for posting the comment.

12. The method of claim 9, wherein the note is associated with a selected portion of content of the document.

13. The method of claim 9, wherein the second UI surface is a comment surface for replying to the content of the first UI surface.

14. The method of claim 9, wherein the second UI surface includes a UI element for posting the comment.

15. The method of claim 9, further comprising:
   receiving a user request to convert the first UI surface to a comment UI surface;
   retrieving data about the note; and
   converting the first UI surface to a third UI surface by using the retrieved data, the third UI surface being editable by only one user.

16. The method of claim 15, wherein the data includes identification information for one or more users who edited the note and the third UI surface displays the identification information.

17. A data processing system comprising:
   a processor; and
   a memory in communication with the processor, the memory comprising executable instructions that, when executed by the processor, cause the data processing system to perform functions of:
   displaying a first user interface (UI) surface for annotating a document, the first UI surface including an editable surface that is editable by a plurality of users and the first UI surface enabling visibility of content to the plurality of users in real-time;
   receiving a request to convert the first UI surface to a conversation UI surface, the first UI surface and the conversation UI surface being surfaces for entering annotations and the first UI surface being a different type of annotation surface than the conversation UI surface; and
   upon receiving the request to convert the first UI surface to the conversation UI surface, converting the first UI surface to a second UI surface by creating the second UI surface using content of the first UI surface, the second UI surface being a UI surface for a comment and the second UI surface being only editable by one user.

18. The data processing system of claim 17, wherein the first UI surface is a note and the note is associated with a selected portion of content of the document.

19. The data processing system of claim 17, wherein the first UI surface automatically posts the content without requiring any user action for posting the content.

20. The data processing system of claim 17, wherein the second UI surface displays user identification information for one or more users who edited the content.

\* \* \* \* \*